United States Patent
Frank

(10) Patent No.: US 6,513,578 B2
(45) Date of Patent: Feb. 4, 2003

(54) FROZEN BEVERAGE MACHINE CONTROL SYSTEM AND METHOD

(76) Inventor: Jimmy I. Frank, 17 Woodsborough, Houston, TX (US) 77055

( * ) Notice: Subject to any disclaimer, the term of this patent is extended or adjusted under 35 U.S.C. 154(b) by 0 days.

(21) Appl. No.: 09/908,505

(22) Filed: Jul. 18, 2001

(65) Prior Publication Data

US 2002/0033021 A1 Mar. 21, 2002

Related U.S. Application Data

(60) Provisional application No. 60/219,591, filed on Jul. 20, 2000.
(51) Int. Cl.$^7$ ............................................. F25B 29/00
(52) U.S. Cl. .............................. 165/63; 62/136; 62/342
(58) Field of Search ........................... 62/68, 136, 342; 165/62, 63, 61

(56) References Cited

U.S. PATENT DOCUMENTS

| | | | | |
|---|---|---|---|---|
| 3,724,235 A | * | 4/1973 | Carpigiani | 165/253 |
| 3,858,498 A | * | 1/1975 | Swenson | 62/342 |
| 4,680,944 A | * | 7/1987 | Menzel | 165/61 |
| 4,706,473 A | * | 11/1987 | Cipelletti | 62/324.3 |
| 4,869,072 A | * | 9/1989 | Sexton et al. | 62/136 |
| 5,967,226 A | * | 10/1999 | Choi | 165/63 |

* cited by examiner

*Primary Examiner*—William E. Tapolcai
(74) *Attorney, Agent, or Firm*—Howrey Simon Arnold & White

(57) ABSTRACT

A method of operating a frozen beverage machine is disclosed that utilizes a short "burst" heating of the beverage machine's freezing chamber. The method includes monitoring a beverage mixture within the freezing chamber of the frozen beverage machine, and heating the freezing chamber for a predetermined time period in response to the beverage mixture reaching a first predetermined state. The freezing chamber is then refrigerated until the beverage mixture reaches a second predetermined state.

23 Claims, 3 Drawing Sheets

FROZEN BEVERAGE MACHINE CONTROL SYSTEM AND METHOD

CROSS-REFERENCE TO RELATED APPLICATION

This application claims the benefit of U.S. Provisional Patent Application Ser. No. 60/219,591, filed on Jul. 20, 2000, the entire contents of which is incorporated by reference herein.

BACKGROUND OF THE INVENTION

1. Field of the Invention

The present invention relates generally to frozen beverage machines and more particularly to an improved method of controlling the consistency of the beverage produced by a frozen beverage machine.

2. Description of Related Art

Frozen beverage machines are known in the art and have been used for years. These devices produce, for example, a frozen carbonated beverage by freezing a mixture of ingredients typically including syrup, water and carbon dioxide in a freezing chamber. The mixture freezes on the inner surface of the chamber, which is surrounded by a helical coil through which a refrigerant passes. A rotating shaft is disposed inside the chamber which has a plurality of outwardly projecting blades that scrape the mixture off the inside wall of the freezing chamber. Once the carbonated beverage is in the desired frozen state, the product is dispensed from the chamber through a product valve.

A control system controls the refrigeration system to maintain the temperature of the ingredients within the freezing chamber. Small ice crystals that are formed during the initial freezing process will continue to grow to larger crystals. These larger ice crystals present significant quality and operational problems with the frozen beverage machine.

First, since the consistency of a frozen beverage is determined to a large extent by the amount and size of the ice crystals present in the beverage mix, the texture and consistency of the dispensed frozen beverage will over time deteriorate and will thus likely become objectionable to a consumer. Further, the ice crystals can attach and freeze on surfaces inside the freezing chamber causing maintenance and other operational problems, and the ice crystals can stop or reduce the flow of the beverage out of the machine's dispensing valve. Still further, the instrumentation systems that control the operation of the machine do not function as well due to the larger ice crystals present in the frozen beverage mixture. The beverage then does not flow well so that it can be controlled and produce a consistent drink.

In an attempt to alleviate these and other problems associated with the formation of large ice crystals in the freezing chamber, known frozen beverage machine systems completely defrost the beverage mixture in the freezing chamber. The frozen beverage mixture is returned to a liquid state on a periodic basis (typically every three to six hours), and then the mixture is refrozen. This removes the larger ice crystals. The defrost and refreeze process typically takes from five to 30 minutes or longer. Unfortunately, when the mixing chamber is defrosting, no product can be served to the consumer. This results in lost sales and unhappy customers.

The present invention is directed to improved frozen beverage machine operation methods which overcome, or at least minimizes, problems associated with the prior art.

SUMMARY OF THE INVENTION

The present invention provides methods for operating a frozen beverage machine so as to improve the consistency of drinks produced by such machines. It is beneficial to extend the time between defrost cycles, or even to eliminate the complete defrost cycles associated with prior art systems entirely, to keep the frozen beverage machine operable without interruption. The operation of the machine and the quality of the product must not substantially deteriorate during the extended periods of no complete defrost. To improve drink consistency, a novel modification to frozen beverage machine operation is disclosed. Instead of employing a defrost cycle that takes the frozen product completely back to a liquid state, the freezing chamber of the frozen beverage machine is heated for a shorter time period on a more frequent basis. This "burst" heating of the freezing chamber can control the size of ice crystals and create advantages to improve the operation of the frozen beverage machine, and in turn, improve the consistency of the beverage produced.

In one aspect of the present invention, the burst heating is conducted on a frequent basis to maintain a consistent frozen drink to reduce the size and amount of ice crystals in the freezing chamber of a frozen beverage machine. The frozen beverage mixture within the freezing chamber approaches a less frozen state, but is not taken to a liquid state as in known defrost cycles, thus maintaining the beverage mixture in a desired consistency.

In an exemplary method of operating a frozen beverage machine in accordance with the invention, the freezing chamber is monitored, and the freezing chamber is heated for a predetermined time period (less than 15 seconds in some embodiments) each time the compressor is to be turned on to refrigerate the freezing chamber. The freezing chamber is then refrigerated until the beverage mixture reaches the desired consistency.

BRIEF DESCRIPTION OF THE DRAWINGS

Other objects and advantages of the invention will become apparent upon reading the following detailed description and upon reference to the drawings in which.

Figure 1:
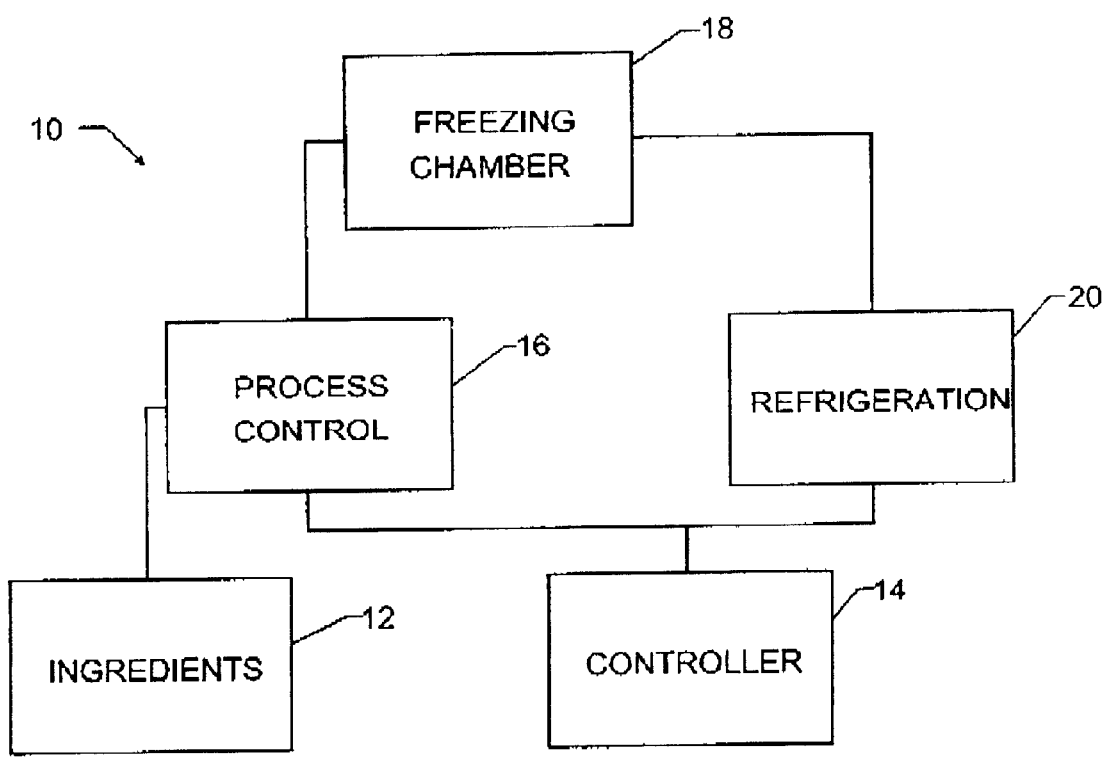
FIG. 1 is a block diagram of portions of a frozen beverage machine.

While the invention is susceptible to various modifications and alternative forms, specific embodiments thereof have been shown by way of example in the drawings and are is herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a simplified block diagram schematically illustrating components of a typical frozen beverage machine 10. The frozen beverage machine 10 includes an ingredients supply source 12, a controller 14, a process flow block 16, at least one freezing chamber 18 and a refrigeration system 20. The ingredient supply source 12 may include, for example, a water supply tank, syrup supply tanks and a carbon dioxide tank.

Ingredients for a frozen beverage mixture are provided from the ingredient supply 12 to the process flow block 16, which controls the flow of the ingredients into the freezing chamber 18 as directed by the controller 14. The controller 14 may comprise an appropriately programmed microprocessor and suitable memory devices encoding program instructions for executing the processes described and illustrated herein. The operation of the control block 16 and other control instrumentation is described, for example, in U.S. Pat. No. 5,706,661 issued to the present inventor, and which is incorporated by reference herein in its entirety.

The refrigeration system 20 functions to keep the beverage mixture within the freezing chamber 18 at the desired consistency, and may also be controlled by the controller 14. The beverage mixture within the freezing chamber 18 is refrigerated such that it freezes on the inner surface of the freezing chamber 18. A rotating shaft (not shown in FIG. 1) is disposed inside the chamber and blades extending outwardly therefrom scrape the mixture off the inside wall of the freezing chamber 18. Once the beverage is in the desired frozen state, the product is dispensed from the chamber 18 through a dispensing valve.

Figure 2:
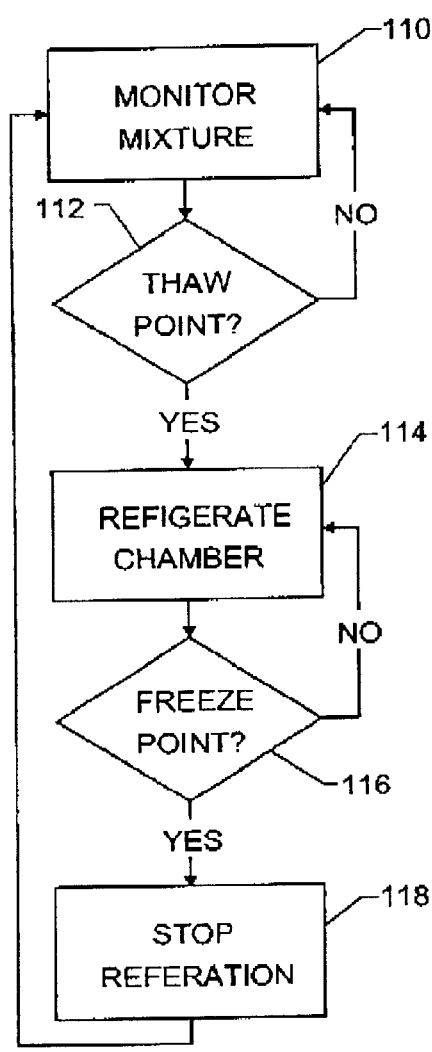
FIG. 2 is a flow diagram illustrating a prior art refrigeration cycle of a frozen beverage machine.

FIG. 2 is a flow diagram illustrating a typical refrigeration cycle for the freezing chamber 18 of the frozen beverage machine 10. In block 110, the beverage mix within the freezing chamber 18 is monitored—any of a number of variables associated with the beverage mixture and/or freezing chamber 18 may be monitored to determine the condition of the beverage mixture. Typically, the beverage mixture is monitored to determine whether it is in a frozen or liquid state. If the mixture has reached a predetermined "thaw" point in decision block 112, the refrigeration system 20 cools the chamber 18 (block 114) until the beverage mixture reaches a "freeze" point as determined in decision block 116, at which point the refrigeration is stopped (block 118), and the process repeats.

At periodic intervals, typically every three to six hours, the freezing chamber is defrosted. The freezing chamber 18 is warmed so that the beverage mixture returns to an unfrozen, liquid state. Then the chamber 18 is refrigerated until the beverage mixture reaches a desired consistency. The defrost and refreeze process typically takes from about five to 30 minutes. A separate heater may be provided to facilitate the defrosting of the freezing chamber, or hot gas from the refrigeration system may be used to accomplish defrosting.

In accordance with the present invention, a short, or "burst" heating of the chamber 18 occurs on a regular, more frequent basis. In one embodiment, the burst heating takes place each time the refrigeration system 20 cycles on to refreeze the chamber 18. As the freezing chamber 18 sits for a period of time without the refrigeration system 20 freezing the liquid, the beverage mixture within the chamber 18 approaches the less frozen thaw point. As discussed above, in known frozen beverage machines, the refrigeration system would then cycle on to refreeze the beverage mixture at this point (block 114 of FIG. 2).

With the system of the present invention, however, a burst heating is initiated when the beverage mixture reaches the thaw point. Thus, the burst heating is initiated in response to a monitored variable associated with the beverage mixture and/or the freezing chamber 18, rather than completely defrosting the system at periodic time intervals. Moreover, the burst heating does not take the beverage mixture to a completely liquid state as with known defrost processes, but rather, enables the larger ice crystals to melt out without reducing the quality of the drink to an unacceptable frozen drink quality. The burst heating may be used in conjunction with fill defrost cycles, or may be used in place of the full defrost to eliminate the undesirable aspects associated with the full defrost.

Figure 3:
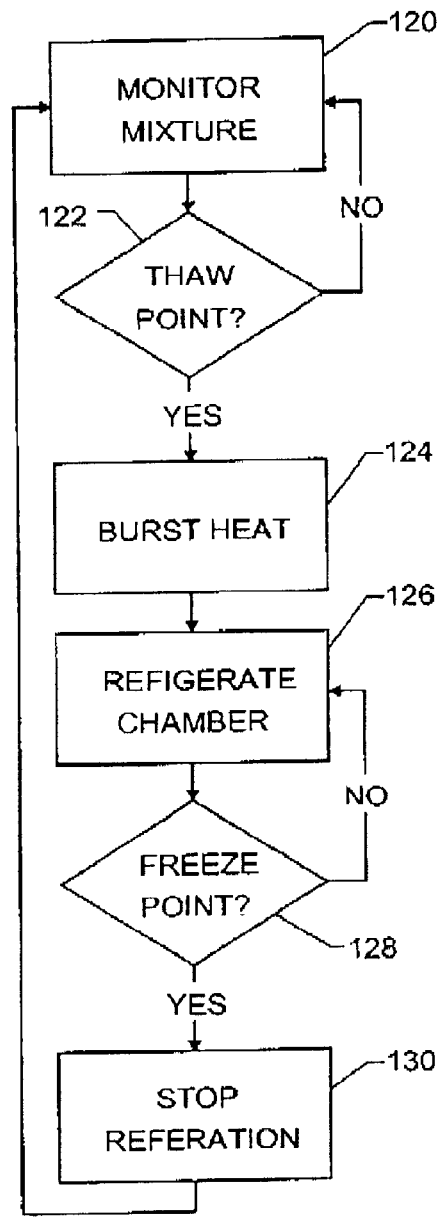
FIG. 3 is a flow diagram illustrating a method of operating a frozen beverage machine in accordance with aspects of the present invention.

FIG. 3 is a flow diagram illustrating aspects of a burst heating cycle in accordance with embodiments of the present invention. As in the prior art refrigeration system illustrated in FIG. 2, the beverage mix is monitored by an appropriate means in block 120. The value of the monitored variable is compared to a first predetermined value representing the thaw point in decision block 122. Rather than refrigerating the chamber 18 upon reaching the thaw point, a burst heating is initiated in block 124 in response to the variable reaching the predetermined thaw point in block 122. In an exemplary embodiment of the invention, the duration of the burst heating is less than 15 seconds, though it may be longer. With the burst heating of the present invention, the beverage mixture does not reach a completely thawed, liquid state as in known full defrost processes. The burst heating operates to remove the larger ice crystals that form as the frozen beverage mixture is contained in the freezing chamber 18.

Upon completion of the burst heating, the chamber 18 is refrigerated (block 126) until the monitored variable reaches a second predetermined value (the freeze point), as determined in decision block 128, at which time the refrigeration is ceased (block 130) and the process repeats.

The burst heating may be accomplished in several manners. For example, upon the beverage mixture reaching the thaw point, the initiation of the refrigeration system may simply be delayed, thus allowing the temperature of the mixture to warm beyond the thaw point to melt some of the formed ice crystals. Alternatively, the freezing chamber 18 may be heated using a heat source for a short period. This may be accomplished via a heater associated with the freezing chamber 18, or by cycling hot gas from the refrigeration system 20 around the chamber 18.

Figure 4:
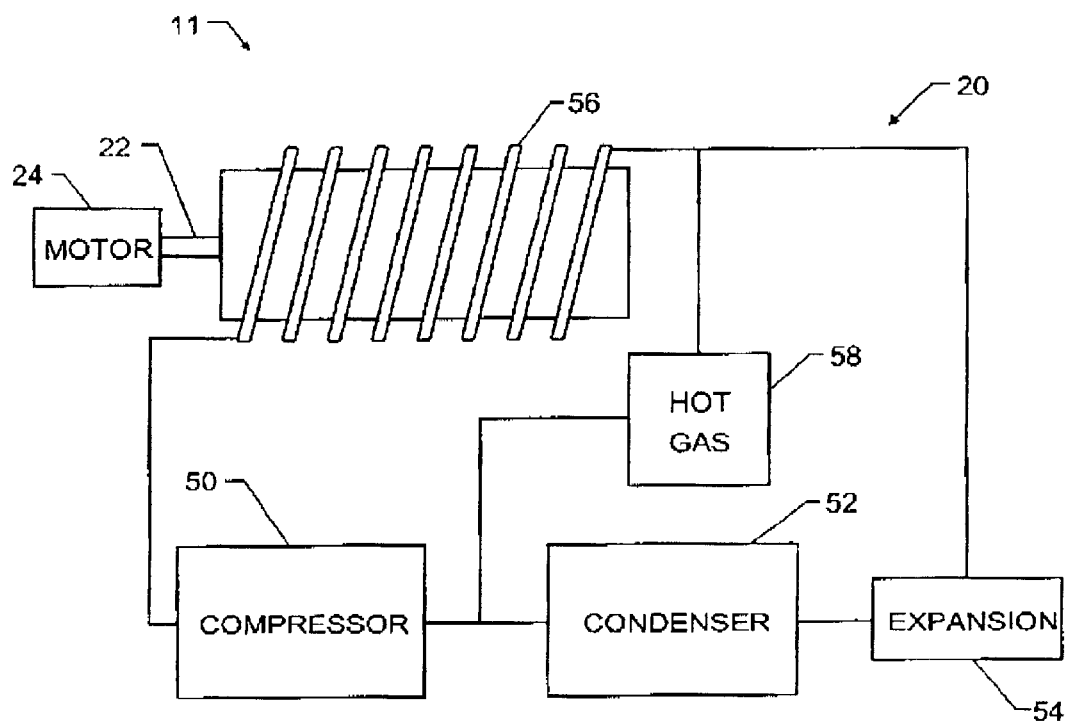
FIG. 4 is a block diagram illustrating a frozen beverage machine in accordance with embodiments of the present invention.

FIG. 4 is a block diagram schematically illustrating portions of a frozen beverage system 11 in accordance with an exemplary embodiment of the present invention that uses the refrigerant to heat the freezing chamber 18. The system 11 includes a freezing chamber 18, and a rotating shaft 22 having a plurality of outwardly projecting blades (not shown) is disposed inside the chamber 18. The shaft 22 is driven by a motor 24, such that the blades mix the ingredients and scrape the mixture off the inside wall of the freezing chamber 18.

The refrigeration system 20 includes a compressor 50, a condenser 52, an expansion valve 54 and an evaporator coil 56 surrounding the freezing chamber 18. The compressor 50 provides the motive force for the particular refrigerant contained within the refrigeration system 20. The compressor 50 forces the refrigerant through the condenser 52, where the refrigerant vapor liquefies. The liquid refrigerant passes through the expansion valve 54, expanding the high-pressure liquid refrigerant to a low-pressure vapor. The low-pressure, low-temperature refrigerant discharged from the thermostatic expansion valve 54 is then directed through the evaporator coil 56 for absorbing heat and thus refrigerating the freezing chamber 18 surrounded by the evaporator coil 56.

The torque of the motor 24 is monitored to determine the state of the beverage mixture within the freezing chamber 18. When the mixture is in a more thawed, liquid state, the torque required to turn the shaft 22 is relatively low. As the mixture becomes more frozen, more torque is required to turn the shaft 22. Thus, in such an embodiment, the variable monitored in the flow diagram of FIG. 3 is motor torque (block 120). When the torque falls to a first predetermined level representing the thaw point in decision block 122, the burst heating is initiated.

The refrigeration system 20 of the exemplary embodiment illustrated in FIG. 4 further includes a hot gas bypass valve 58. When the burst heating is initiated in block 124 of FIG. 3, the compressor 50 is started and the hot gas bypass valve 58 is opened for a short period (less than 15 seconds in one embodiment), allowing the refrigerant to bypass the condenser 52 and expansion valve 54. Thus, the refrigerant is not liquefied, but remains a hot gas. The hot gas is directed through the coil 56, warming the chamber 18. When the burst heating period is completed, the compressor 50 continues to operate, the hot gas valve 58 closes, and the expansion valve 54 opens to refrigerate the freezing chamber 18 (block 126 of FIG. 3). The motor torque is monitored, and when it reaches a second predetermined level representing the freeze point, the refrigeration is stopped as shown in block 130 and the process repeats.

In further embodiments, other variables are monitored to determine the state of the beverage mixture, and the burst heating of the chamber 18 is then conducted in response to the measured variable. For instance, the temperature of the mixture may be monitored using any appropriate means, such as a thermometer. The burst heating would then be initiated in response to the mixture temperature reaching a predetermined thaw temperature. Alternatively, the viscosity of the mixture may be determined by monitoring an appropriate variable, with the burst heating being initiated in response thereto.

The methods of operating frozen beverage machines disclosed herein thus provide a beverage having a stable consistency, resulting in an enhanced beverage product. Further, since the frozen beverage mixture within the freezing chamber is more consistent, the performance of the instrumentation systems controlling the equipment operation is enhanced, resulting in the following benefits:

a) Liquid refill is controlled more consistently, which controls the pressure in the freezing chamber.
b) The thaw-freeze cycles are more consistent and produce an improved frozen drink.
c) When gases such as carbon dioxide are injected into the freezing chamber to create a frozen carbonated beverage, the control of the instrumentation and the quality of the resulting drink is improved.
d) When the frozen beverage machine sits for an extended period of time without a drink being dispensed, the "casual" drink is of higher quality due to the improved consistency of product throughout the frozen chamber.
e) The control of build-up of large ice crystals reduces freeze-ups in the dispensing valve and in the inlet liquid orifice to the freezing chamber.
f) The burst heating cycles keep the average temperature of the metal components of the freezing chamber from becoming too cold, thus preventing or at least reducing ice accumulations effecting machine operations.

Thus, the methods and devices of the disclosed invention, including implementation of short burst heating in frequent cycles greatly enhances the operation of the frozen dispenser and the quality of the dispensed drink. Maintenance of the equipment is reduced due to improved operation of the control instrumentation systems and mechanical components such as valves. Reduced downtime of the equipment will result from reduction or elimination of extended defrost cycles required to take the frozen mixture to a liquid.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of operating a frozen beverage machine, comprising:
    monitoring a beverage mixture within a freezing chamber of the frozen beverage machine;
    heating the freezing chamber for a predetermined time period in response to the beverage mixture reaching a first predetermined state; and
    refrigerating the freezing chamber until the beverage mixture reaches a second predetermined state.

2. The method of claim 1, wherein monitoring the beverage mixture includes monitoring the torque required to turn a shaft situated in the freezing chamber.

3. The method of claim 1, wherein monitoring the beverage mixture includes monitoring the temperature of the beverage mixture.

4. The method of claim 1, wherein the predetermined time period is less than 15 seconds.

5. The method of claim 1, wherein heating the freezing chamber includes flowing a hot gas through a coil surrounding the freezing chamber.

6. The method of claim 5, wherein flowing a hot gas comprises flowing uncondensed refrigerant through the coil.

7. The method of claim 1, wherein the heating of the freezing chamber does not result in the beverage mixture reaching a completely liquid state.

8. A program storage device readable by a machine and encoding a program of instructions for operating a frozen beverage machine, comprising:
    monitoring a beverage mixture within a freezing chamber of the frozen beverage machine;
    heating the freezing chamber for a predetermined time period in response to the beverage mixture reaching a first predetermined state; and
    refrigerating the freezing chamber until the beverage mixture reaches a second predetermined state.

9. A control system for a frozen beverage machine having a freezing chamber, the control system comprising:

a processor connected to receive a signal indicating the state of a beverage mixture in the freezing chamber;

a memory device connected to the processor, the memory device storing program code that when executed by the processor implements a method including:

heating the freezing chamber for a predetermined time period in response to the beverage mixture reaching a first predetermined state; and refrigerating the freezing chamber until the beverage mixture reaches a second predetermined state.

10. A frozen beverage machine, comprising:

freezing chamber;

an evaporator coil surrounding the freezing chamber;

an expansion valve connected to the evaporator coil;

a condenser connected to the expansion valve;

a compressor connected to the condenser to force a refrigerator through the condenser, expansion valve and evaporator coil to refrigerate the freezing chamber;

a bypass valve connected between the compressor and the evaporator coil, the bypass valve having an open position in which the refrigerant bypasses the condenser and expansion valve to selectively heat the freezing chamber; and a controller programmed to monitor a beverage mixture contained in the freezing chamber, the controller connected to the bypass valve to set the bypass valve in the open position for heating the beverage mixture for a predetermined time period in response to the beverage mixture reaching a first predetermined state and in the closed, position for refrigerating the freezing chamber until the beverage mixture reaches a second predetermined state.

11. A frozen beverage machine, comprising:

a freezing chamber;

means for selectively refrigerating the freezing chamber;

means for selectively heating the freezing chamber; and means for controlling the means for selectively heating in response to a beverage mixture contained in the freezing chamber reaching a first predetermined state ad means for selectively refrigerating in response to the beverage mixture reaching a second predetermined state.

12. The frozen beverage machine of claim 11, wherein the means for selectively refrigerating and means for selectively heating comprise:

an evaporator coil surrounding the freezing chamber;

an expansion valve connected to the evaporator coil;

a condenser connected to the expansion valve;

a compressor connected to the condenser to force a refrigerant through the condenser, expansion valve and evaporator coil to refrigerate the freezing chamber; and a bypass valve connected between the compressor and the evaporator coil, the bypass valve having an open position in which the refrigerant bypasses the condenser and expansion valve to selectively heat the freezing chamber.

13. The method of claim 1, wherein monitoring the beverage mixture includes monitoring the viscosity of the beverage mixture.

14. The method of claim 1, wherein the first predetermined state represents the thaw point of the beverage mixture.

15. The method of claim 1, wherein the second predetermined state represents the freezing point of the beverage mixture.

16. The method of claim 8, wherein the heating of the freezing chamber does not result in the beverage mixture reaching a completely liquid state.

17. The method of claim 9, wherein the heating of the freezing chamber does not result in the beverage mixture reaching a completely liquid state.

18. The method of claim 9, wherein the first predetermined state represents the thaw point of the beverage mixture.

19. The method of claim 9, wherein the second predetermined state represents the freezing point of the beverage mixture.

20. The frozen beverage machine claim 10, wherein the first predetermined state represents the thaw point of the beverage mixture.

21. The frozen beverage machine of claim 10, wherein the second predetermined state represents the freezing point of the beverage mixture.

22. The frozen beverage machine of claim 11, wherein the first predetermined state represents the thaw point of the beverage mixture.

23. The frozen beverage machine of claim 11, wherein the second predetermined state represents the freezing point of the beverage mixture.

* * * * *